United States Patent [19]

Hovarter

[11] Patent Number: 4,976,284

[45] Date of Patent: Dec. 11, 1990

[54] REED VALVE FOR PISTON MACHINE

[75] Inventor: Len A. Hovarter, Grand Island, N.Y.

[73] Assignee: General Motors Corporation, Detroit, Mich.

[21] Appl. No.: 465,824

[22] Filed: Jan. 16, 1990

[51] Int. Cl.⁵ ............................................. F16K 15/16
[52] U.S. Cl. ................... 137/512.4; 137/856; 417/269
[58] Field of Search ............ 137/855, 856, 512.4; 417/269

[56] References Cited

U.S. PATENT DOCUMENTS 4,764,091  8/1988  Ikeda ................................. 417/269

FOREIGN PATENT DOCUMENTS

| 449509 | 6/1975 | U.S.S.R. | 137/855 |
| 861615 | 2/1961 | United Kingdom | 137/855 |
| 2161583 | 1/1986 | United Kingdom | 137/855 |

Primary Examiner—Robert G. Nilson
Attorney, Agent, or Firm—Ronald L. Phillips

[57] ABSTRACT

A suction reed valve for a piston machine is provided with a port therethrough for increasing suction flow efficiency and thereby the volumetric efficiency of the machine. A stop is provided in conjunction with the added suction port in the valve to limit the lift and thereby the stress of the suction reed valve.

2 Claims, 2 Drawing Sheets

REED VALVE FOR PISTON MACHINE

TECHNICAL FIELD

This invention relates to reed valves for piston machines and more particularly to the configuration of the reed valve.

BACKGROUND OF THE INVENTION

In piston machines such as axial piston compressors of both the swash plate and wobble plate type currently used in motor vehicle air conditioning systems, the suction ports for the respective pumping chambers (piston cylinders) are typically formed in a valve plate and are each normally closed by a reed valve that seals on the valve plate about the respective port and is formed integral with the other reed valves in a flat thin metal disc. When the pressure of the fluid (e.g. gaseous refrigerant) in the piston cylinder reduces below that in the compressor's suction chamber sufficiently to overcome the spring force in the reed valve, the reed valve lifts off its sealing surface allowing the then expanding pumping chamber to suck the refrigerant past the sides of the reed valve. The reed valve is a compact device that is easy to manufacture and assemble but does present more flow restriction than for example a poppet valve. And because of its cantilever mounting, the reed valve experiences stress levels that increase with increasing opening force and can therefore become a limiting factor.

SUMMARY OF THE INVENTION

The present invention provides a means of increasing the flow efficiency of the reed valve while limiting its stress level and all in a simple cost effective manner. Normally the reed valve is imperforate in the region closely adjacent its distal valve closing portion but according to the present invention there is provided a port in this normally otherwise imperforate area through which the suction gas can flow into the piston cylinder while also normally flowing around the sides of the reed valve. And because of this increased flow efficiency, the valve lift can then be reduced and is done so by simply adding a stop which limits the lift to an acceptable stress level lower than that that would normally be encountered without the provision of the by-pass suction port in the reed valve.

It is thus an object of the present invention to provide a new and improved reed valve configuration that increases its flow efficiency.

Another object is to provide a suction reed valve for a piston machine that has a by-pass port intermediate its valve closing portion and its attaching point for increased flow efficiency.

Another object of the present invention is to provide a suction reed valve for a piston machine that has a by-pass port therein intermediate its valve closing portion and its attaching point and, in addition, a stop for limiting the lift of the suction reed valve to a stress level lower than that which would occur without the by-pass port.

These and other objects, advantages and features of the present invention will become more apparent from the following description and drawing in which:

DETAILED DESCRIPTION OF THE INVENTION

Figure 2:
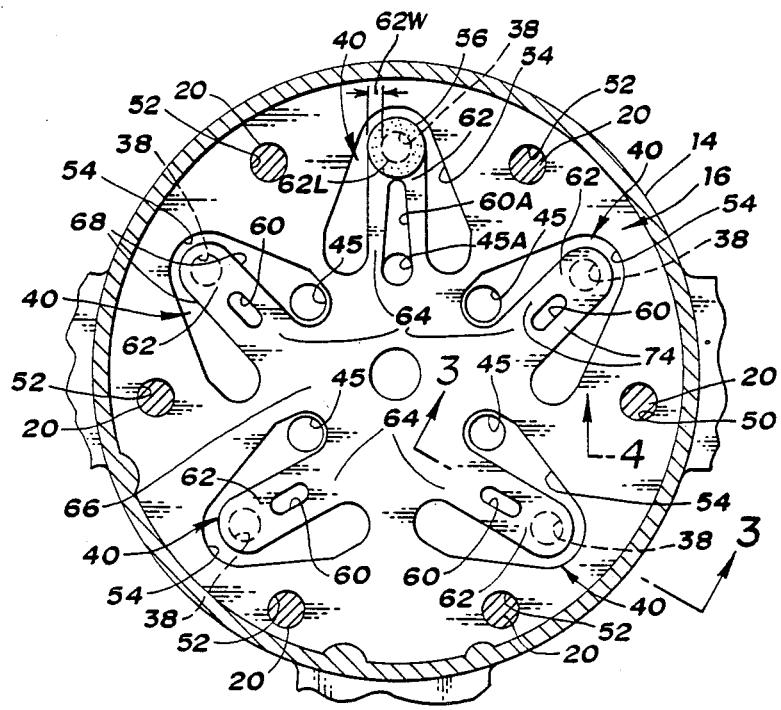
FIG. 2 is a view taken along the line 2—2 in FIG. 1.

Referring to the drawings, the preferred embodiment of the suction reed valve according to the present invention is shown incorporated in an axial piston wobble plate refrigerant compressor like that disclosed in U.S. Pat. No. 4,428,718 which is hereby incorporated by reference. The compressor generally comprises a crankcase 10, cylinder block 12 and head 14. A suction valve disc 16 and valve plate 18 are sandwiched between the cylinder block and head. And the head, cylinder block, crankcase, suction valve disc and valve plate are all bolted together by a plurality of circumferentially spaced axially extending bolts 20 as shown in FIG. 2. A drive shaft 22 rotatably mounted in the compressor is adapted to be driven by a motor vehicle engine (not shown) through a belt 24 and pulley 26 by engagement of an electromagnetic clutch 28 mounted on the compressor. The drive shaft 22 in turn operates to drive five (5) pistons 30 (only one being shown) received in parallel arranged cylinders 32 in the cylinder block 12, the drive between the drive shaft and the pistons being through a tiltable wobble plate mechanism (not shown).

Figure 1:
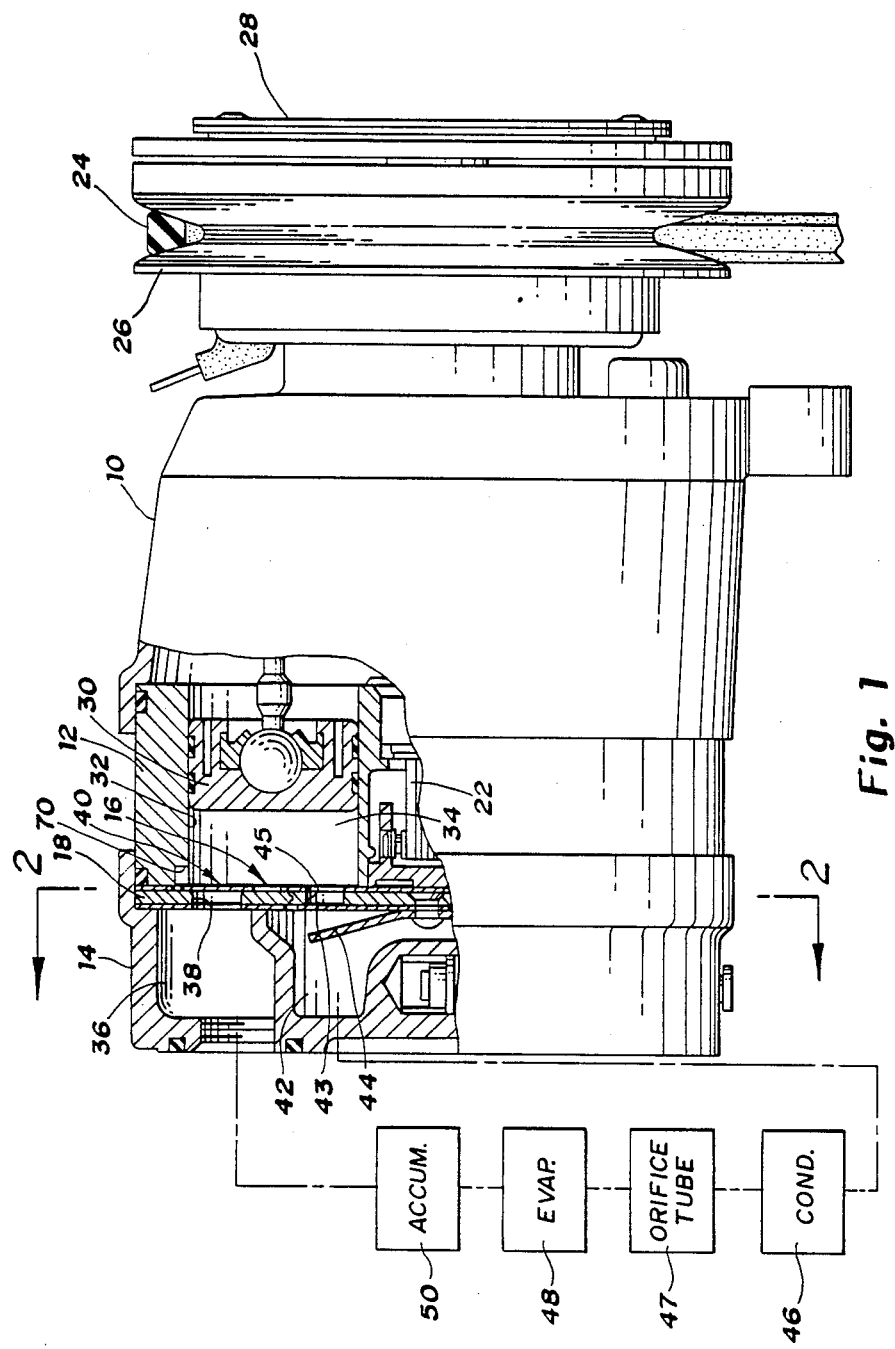
FIG. 1 is a side view with parts broken away of a motor vehicle air conditioning compressor having suction reed valves according to the present invention incorporated therein.

The valve plate and the respective piston heads and cylinders form working chambers 34 (only one being shown) into which low pressure gaseous refrigerant is drawn on the respective piston suction stroke from a suction cavity 36 in the cylinder head through individual circular suction ports 38 in the valve plate and both around and through associated suction reed valves 40 formed in the suction valve disc 16 as will be described in more detail later. The gas in the working chambers is then exhausted on the respective piston's delivery stroke at an elevated pressure to a discharge cavity 42 located centrally of the cylinder head. The discharge of the gaseous high pressure refrigerant from the cylinders to the discharge cavity is through individual exhaust ports 45 in the valve plate and is controlled by individual reed type discharge valves 43 with a backstop 44 at these ports (only one being shown, see FIG. 1).

The compressor is adapted to be connected in a motor vehicle air conditioning system wherein the discharge from the discharge cavity 42 is directed to a condenser 46 and thence through an orifice tube 47 to an evaporator 48 and from there through an accumulator 50 to the suction cavity 36 of the compressor.

The suction valve disc 16 is flat and is stamped with a number of perforations in the form of round holes 52 to accommodate the bolts 20 and U-shaped cut-outs 54 which form the cantilevered suction reed valves 40 that normally close the respective suction ports 38. The cut-outs 54 also provide an opening through the suction valve disc for four (4) of the five (5) exhaust ports, it being necessary because of space considerations to provide a separate aperture in one of the suction valves for accessing the remaining fifth exhaust port which is at the 12 o'clock position as seen in FIG. 2 and will be discussed in more detail later.

The suction reed valves 40 normally seat near their distal end on the valve plate about their respective suction port to close same. Then on the respective suction strokes of the pistons, and when the fluid pressure in the respective pumping chamber then drops sufficiently low so that the differential pressure across the respective suction valve reed is sufficient to offset the inherent spring force of the reed valve, the valve then lifts off its sealing surface on the valve plate allowing the gaseous refrigerant from the suction cavity to be drawn into the pumping chamber as the piston proceeds toward the bottom of its intake stroke. Then on piston reversal and the accompanying rise in pressure in the pumping chamber, the suction valve is closed thereby while pressure then continues to build and eventually to the point where it is sufficient to overcome the inherent spring force of the respective discharge reed valve at which time the latter then opens to exhaust the pressurized gaseous refrigerant into the discharge cavity. The compressor details and operation thus far described are like that disclosed in the aforementioned U.S. Pat. No. 4,428,718 to which reference is made for a more detailed understanding of the compressor and its components apart from the present invention which will now be described in detail.

Figure 3:
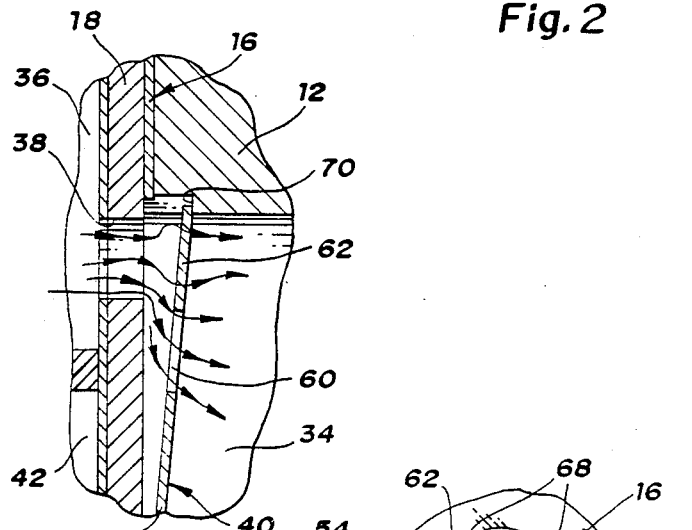
FIG. 3 is an enlarged view taken along the line 3—3 in FIG. 2.
Figure 4:
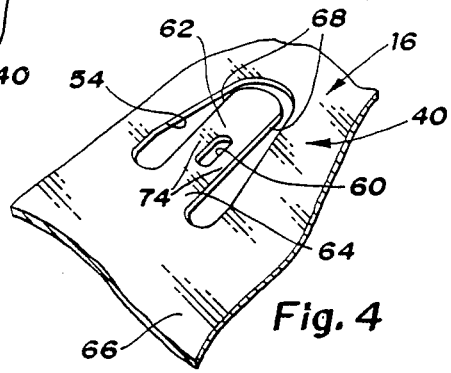
FIG. 4 is a perspective view of one of the reed valves in FIG. 2.

The preferred embodiment of the present invention is incorporated in the above compressor structure and provides a means of increasing the compressor's volumetric efficiency while limiting the stress level in the suction reed valves to a selected acceptable level. The volumetric efficiency increasing means comprises the simple provision of an elongated by-pass port 60 in each of the suction reed valves 40 at a location intermediate their distal valve closing portion 62 and their base 64 where they are cantilevered by being joined with the center section 66 of the valve disc that is clamped between the valve plate and the cylinder block. The valve portion 62 is formed so as to encompass a flat circular sealing land 62L (shaded area, see FIG. 2) that is adapted to seal about the suction port over a land width 62W that extends to the outer perimeter of the valve portion and is just sufficient to effect efficient sealing. The by-pass ports 60 extend longitudinally of their respective valve to the outer perimeter of the sealing land 62L so as to thus open to the suction port to the same degree as the outer perimeter of the valve portion when the valve opens. The ports 60, which will be referred to as by-pass suction ports because they by-pass the gas refrigerant directly through the suction reed valve as compared with the flow normally around the two parallel sides 68 thereof all have the same shape except for that identified as 60A which is at the 12 o'clock position in FIG. 2 and which is further formed by enlargement at its valve base end to also serve as an opening for the associated irregularly spaced discharge port 45A. With the addition of the by-pass port 60 in each suction valve and on opening of the latter during the respective piston suction stroke, the gaseous refrigerant being drawn in through the respective suction port 38 is now allowed to not only pass around the sides of the respective suction reed valve but, in addition, is allowed to be drawn directly therethrough by the respective suction by-pass port as shown by the arrows in FIG. 3. And because the by-pass port is located closely radially inward of the valve port toward the center of the respective pumping chamber, there is thus provided a more direct route thereto than that around the sides of the valve. This all contributes to a more efficient flow into the suction chamber not only because of increased access about the valve closure portion 62 more after the manner of a poppet valve but, in addition, because of a more direct routing into the pumping chamber.

With the higher flow efficiency allowed by the by-pass suction port, the suction valve is then not required to lift as much as would be required without the addition thereof, and this is taken advantage by then providing a stop in the form of a shoulder 70 formed in the respective cylinder which is engaged by the distal end of the respective suction reed valve to limit its lift off of the valve plate. The allowed lift is determined to be less than that that would be normally be required for good volumetric efficiency but not so limited as to not take advantage of the increased flow effectiveness provided by the addition of the by-pass port.

In determining the shape of the by-pass valve ports 60, an oval shape was selected as compared with a circular hole as it allows increased material 74 either side thereof to preserve the beam strength of the suction valve (i.e. a circular hole of the same area would leave less or narrower material adjacent thereto along the valve sides). Moreover, it will be appreciated that the elongation of the singularly shaped by-pass port 60A takes advantage of the addition of such to eliminate the need for an additional perforation in the disc for the one irregularly spaced discharge port 45A which thus reduces the die cost while allowing a high integrity grouping of the perforations forming the reed valve configurations.

The foregoing description of the preferred embodiment of the invention has bene presented for purposes of illustration and description. It is not intended to be exhaustive or to limit the invention to the precise form disclosed as obvious modifications or variations are possible in light of the above teachings. The embodiment was chosen and described to provide the best illustration of the principle of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A flat suction valve disc having an integral center portion for attaching the disc in a piston machine and a plurality of integral suction reed valves extending from said center portion and each having a semi-circular distal valve portion for closing and opening a circular suction port in the piston machine, characterized by said valve portion encompassing a flat circular sealing land that is adapted to seal about the suction port over a land width that extends to the radius of the semi-circular valve portion and is just sufficient in radial extent to effect efficient sealing, an elongated by-pass suction port in each said valve located between the respective said semi-circular distal valve portion and said center portion and extending longitudinally of said valve to said sealing land so as to specially open to the suction port to the same degree as the outer perimeter of the semi-circular valve portion when the valve opens.

2. In combination, a flat suction valve disc having an integral center portion for attaching the disc suction in a piston machine and a plurality of integral suction reed valves extending from said center portion and each having a semi-circular distal valve portion for closing and opening a circular suction port in the piston machine, said valve portion encompassing a flat circular sealing land that is adapted to seal about the suction port over a land width that extends to the radius of the semi-circular valve portion and is just sufficient in radial extent to effect efficient sealing, an elongated by-pass suction port in each said valve located between the respective said semi-circular distal valve portion and said center portion and extending longitudinally of said valve to said sealing land so as to specially open to the suction port to the same degree as the outer perimeter of the semi-circular valve portion when the valve opens, and stops in said piston machine for contacting the respective valves to limit the lift of their valve closing portion.

* * * * *